United States Patent [19]
Miller et al.

[11] Patent Number: 5,449,904
[45] Date of Patent: Sep. 12, 1995

[54] BROADBAND PASSIVE OPTICAL LIMITER USING A PHOTOREFRACTIVE CRYSTAL, CYLINDRICAL LENS AND FILTER TO PROTECT AGAINST SUBSTANTIALLY ALL PULSEWIDTHS AND CONTINUOUS WAVE LASERS

[75] Inventors: Mary J. Miller, Springfield, Va.; Gregory J. Salamo, Fayetteville, Ark.; William W. Clark, III, Lorton, Va.; Gary L. Wood, Centerville, Va.; Edward J. Sharp, Fredericksburg, Va.; Brian D. Monson, Tulsa, Okla.

[73] Assignee: The United States of America as represented by the Secretary of the Army, Washington, D.C.

[21] Appl. No.: 351,202

[22] Filed: Nov. 30, 1994

[51] Int. Cl.$^6$ .................... H01J 3/14; H01J 5/16; H01J 40/14
[52] U.S. Cl. ...................... 250/216; 359/241
[58] Field of Search ............. 250/216, 226; 359/244, 359/241, 322, 601

[56] References Cited

U.S. PATENT DOCUMENTS

| | | | |
|---|---|---|---|
| 4,846,561 | 7/1989 | Soileau, Jr. et al. | 359/241 |
| 4,909,609 | 3/1990 | McDowell | 359/241 |
| 5,073,705 | 12/1991 | Sharp et al. | 250/216 |
| 5,080,469 | 1/1992 | McCahon et al. | 359/241 |
| 5,280,169 | 1/1994 | Honey et al. | 250/216 |
| 5,283,697 | 1/1994 | Tutt et al. | 359/885 |
| 5,301,069 | 4/1994 | Wood et al. | 359/890 |

*Primary Examiner*—Edward P. Westin
*Assistant Examiner*—Stephen Calogero
*Attorney, Agent, or Firm*—Milton W. Lee; Alain L. Bashore; Anthony T. Lane

[57] ABSTRACT

A passive broadband sensor protection and enhancement system and technique. Incident light is focused with a cylindrical lens on the optical axis into an intense light strip onto the input face of a photorefractive crystal on the optical axis. The crystal includes optional anti-reflection coatings proximate to the input and output face. A broadband high reflection coating is proximate to the input face for reflection of all radiation from approximately 0.68 to at least out to 1.5 micrometers wavelength. Light exiting from the output face of the crystal results from a photorefractive process that includes a transmitted beam and beam fan. The beam fan is fanned out of the optical path in a direction determined by the c-axis, dominant electro-optic coefficient, and charge carriers participating in the photorefractive process. The transmitted beam contains only incoherent radiation as input to a sensitive detector resulting in broadband multiline protection from the visible spectrum for substantially all pulsewidths and cw lasers, with enhanced time response and interaction length.

4 Claims, 5 Drawing Sheets

BROADBAND PASSIVE OPTICAL LIMITER USING A PHOTOREFRACTIVE CRYSTAL, CYLINDRICAL LENS AND FILTER TO PROTECT AGAINST SUBSTANTIALLY ALL PULSEWIDTHS AND CONTINUOUS WAVE LASERS

BACKGROUND OF THE INVENTION

1. Field of the Invention

The present invention generally relates to optical limiters and more specifically, to performance enhancement systems and techniques for photorefractive crystal optical limiters.

2. Description of Prior Art

It is well known that optical sensors can be damaged by exposure to intense laser radiation of both pulsed and continuous wave (cw) varieties. Protectors or optical limiters may be of two general types, active or passive. Active optical limiters require a predetermination of the presence of threat radiation and then must provide an external stimulus (such as an applied electric field) to operate the limiter. Active devices are usually complex (tunable filters, for example) and are unable to rapidly respond to short pulses or bursts of harmful radiation. Passive protectors are preferred since the threat radiation itself triggers the desired protective response.

One of the more difficult aspects of sensor protection arises from the broad temporal range of available threats (i.e., lasers operating in temporal modes from continuous wave to picosecond pulses can pose serious problems for sensitive detectors). There are very few optical nonlinearities that can be used to passively protect a sensor over this broad range of temporal response. The photorefractive nonlinearity found in photorefractive crystals is one exception.

An example of photorefractive crystal power limiters may be found in U.S. Pat. No. 5,073,705 to Sharp et al. entitled "Broadband, Multi-line, Optical Power Limiting Scheme" issued Dec. 17, 1991, incorporated herein by reference. Photorefractive crystals as power limiters continue to have performance problems with regards to time response and beam depletion. The time response for photorefractive beam fanning depends inversely on the incident intensity which determines the limiting threshold. Currently, the time response in these types of limiters have yet to be optimized so as to decrease the limiting threshold. If ample time is allowed for the limiting to occur, even very weak cw beams (approx. 1 milliwatt) can be limited. Also, there is yet to be determined a way to maintain the maximum interaction length in the photorefractive medium while fanning the incident light, so that the maximum coupling of energy into the fanned beams and out of the incident beams (beam depletion) can be achieved.

While the prior art has reported using optical limiters based on photorefractive limiters none have established a basis for a specific apparatus that is dedicated to the task of resolving the particular problem at hand. What is needed in this instance is a beam fanning limiter system and technique which achieves improved time response and maximum interaction length. This would yield truly passive broadband sensor protection against high intensity, short-pulse, high repetition rate multi-line lasers and multi-line cw lasers.

SUMMARY OF THE INVENTION

It is therefore the object of the invention to provide a beam fanning limiter system and technique which achieves improved time response and maximum interaction length which yields broadband protection for all pulsewidths and cw lasers with high laser damage threshold.

According to the invention, a passive broadband sensor protection and enhancement technique and system achieves broadband multiline protection from the visible spectrum for substantially all pulsewidths and cw lasers, and also resulting in enhanced time response and interaction length. A photorefractive crystal on the optical axis is provided, where the crystal includes an input and output face. The inhibition of reflection on the input and output face of the photorefractive crystal is provided with anti-reflection coatings. A broadband high reflection coating on the anti-reflection coating of the input face provides for high reflection of broadband emission input. Incident light is focused on the optical axis into an intense light strip coincident upon the input face relative to a plane normally referred to as the c-axis of the crystal.

Light exiting from the output face of the crystal results from a photorefractive process that includes a transmitted beam and beam fan. The beam fan is fanned out of the optical path in a direction determined by the c-axis, dominant electro-optic coefficient, and charge carriers participating in the photorefractive process. The transmitted beam contains only incoherent radiation as input to the sensitive detector resulting in broadband multiline protection from the visible spectrum for substantially all pulsewidths and cw lasers, and also resulting in enhanced time response and interaction length.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
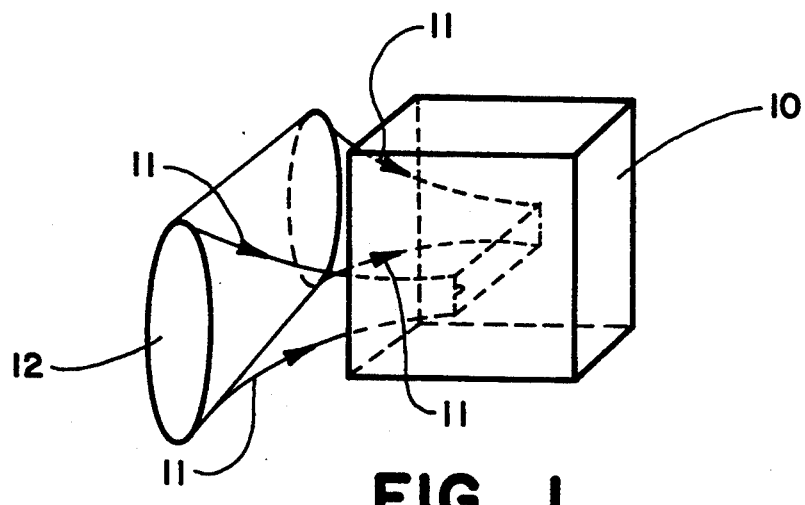
FIG. 1 is a perspective view showing the beam fanning technique achieved by the invention in a photorefractive crystal.
Figure 2:
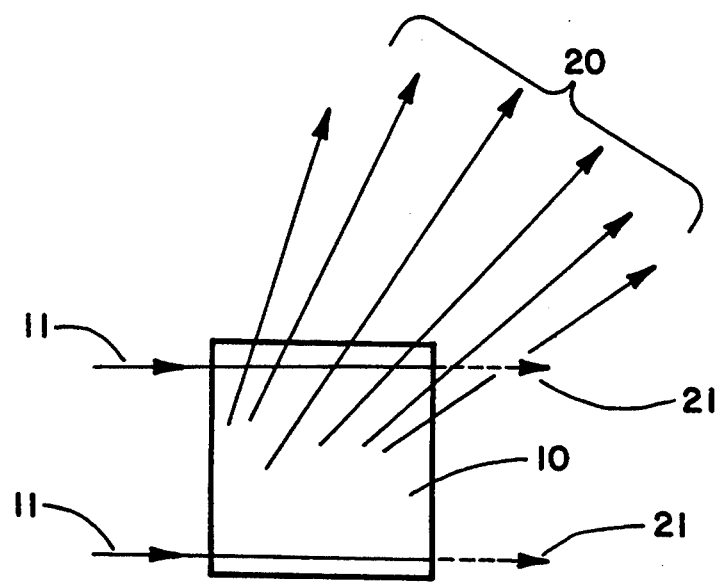
FIG. 2 is a top view of 1.

Referring now to the drawings, and more particularly to FIGS. 1 and 2, there is shown the general concept of beam fanning in a photorefractive crystal 10 of FIG. 1. The particular photorefractive process of asymmetric self-defocusing of "beam fanning" which results from wave mixing or beam coupling to be exploited as a sensor protection device is to be describe herewithin. The photorefractive process arises from the second-order nonlinear optical susceptibility and has a distinguishing feature, such as the time response depends on the intensity. Improvement in the time response depends on the incident intensity (I) according to the relationship:

$$\tau = A/I^x$$

where:

x is approximately unity, and

A is a material parameter with units of energy density that determines the limiting threshold.

photorefractive crystal 10 is arranged so that many mutually incoherent beams 11 (i.e., beams of significantly different wavelengths) will be photorefractively "fanned" as shown in FIG. 2 as beam fan 20 to one side of the incident beam direction 21 even when they are introduced into crystal 10 simultaneously. The present invention seeks to exploit the coherent beam amplification and deamplification process associated with beam fanning by improving the time response for the grating formation and by maximizing the gain-length product in any particular crystal through the use of focusing with cylindrical optics such as cylindrical optic 12 shown in FIG. 1.

Figure 3:
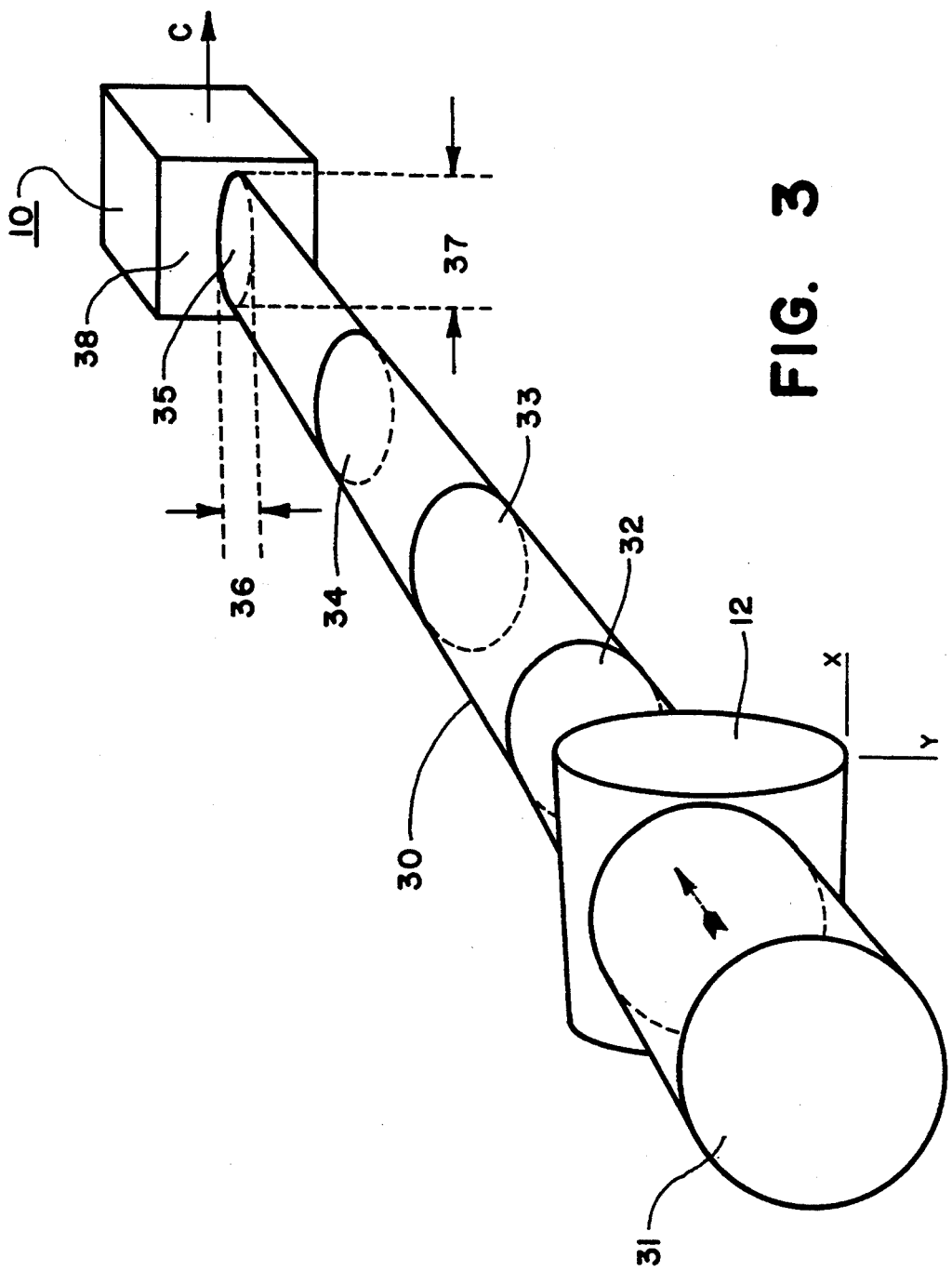
FIG. 3 is a perspective view showing the focusing arrangement utilized in the invention.

FIG. 3 depicts the focusing arrangement utilizing cylindrical lens 12 as shown for optical cross-sectional areas along optical path 30 to crystal 10. Crystal shapes are generally parallelipeds with face dimensions on the order of ½ to 1 cm. Input crossectional area 31 is shown as approximately circular in cross section (as from a typical laser source) and is input to cylindrical lens 12. The cylindrical lens may be of any convenient size which conforms to the particular optical system containing the sensor to be protected. However, it is convenient to use cylindrical lens which are square, i.e. the dimensions in the lens in the x- and y- directions (shown in FIG. 3) are equal. The input to the lens could be defined by a circular input aperture which would then (along with the focal length of the lens) define the f/# of the lens system. Since only the direction has a radius of curvature, light is only focused in this dimension. Light is unfocused in the x-direction and will propagate to the crystal experiencing only normal diffraction. The size of the beam in the x-direction will be determined by the entrance aperture and the y-direction by the f/#.

Intervening focus crossectional areas 32, 33 and 34 show a single axis convergence of the input beam which is the result of the light passing through cylindrical lens 12. This convergence produces focusing in one dimension only, and results in a beam with elliptical crossectional dimensions. For the purposes of this invention, the focused dimension is defined as the minor axis length of the elliptical cross section and interaction length is the major axis length of the elliptical cross section. As a result of the use of cylindrical lens 12 there is effected a crossectional area 35 as input to crystal face 38 which has a tight focus 36 and interaction length 37.

Figure 4:
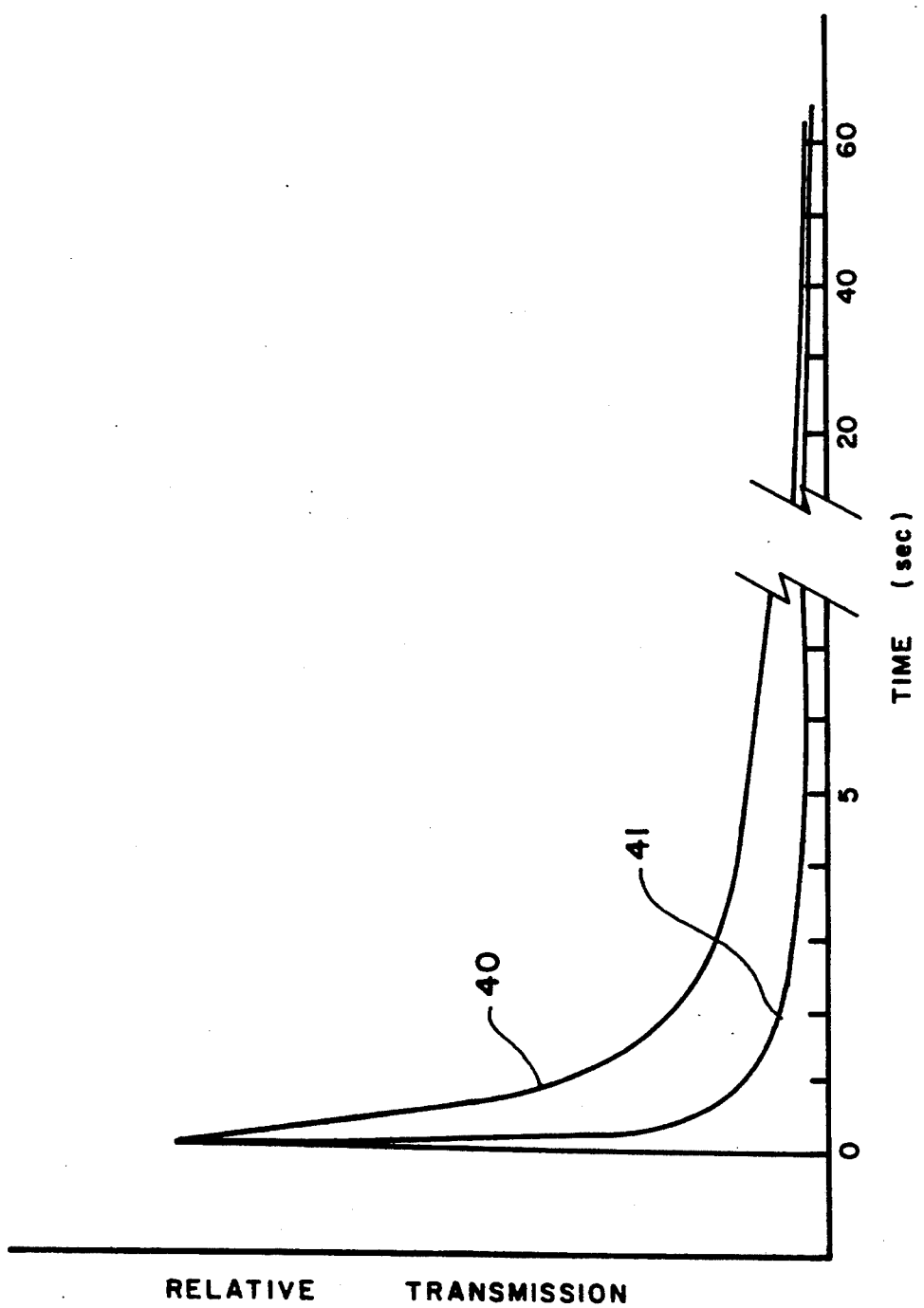
FIG. 4 is a graph of relative throughput transmission as a function of time for the invention.

FIG. 4 a graph of relative throughput transmission as a function of time in seconds for three optical arrangements including the present invention. Line 40 through 41 show the time response curves for no lens and a cylindrical lens respectively. The cylindrical lens results in a decreased spot size in the photorefractive medium leading to an increase in the incident intensity. It is the elliptical shape of the cylindrically focused beam that takes advantage of the dominant electro-optic coefficient over a longer path length and gives the measured performance shown in FIG. 4. The time response is improved and the lower overall transmission shows stronger beam depletion. In the case of the cylindrical lens this depletion is strong and fast. The speed depends on intensity (I) such that at the crystal:

I ~ Area of entrance aperture/Area of focal spot where:

f/# = (focal length)/(diameter of entrance aperture)
area of focal spot = (Wo) × (diameter of entrance aperture)
$W_o = \{[(2) \times (4000)]/3\} \times (1.22) \times (f/\#) \times$ (wavelength)

Figure 5:
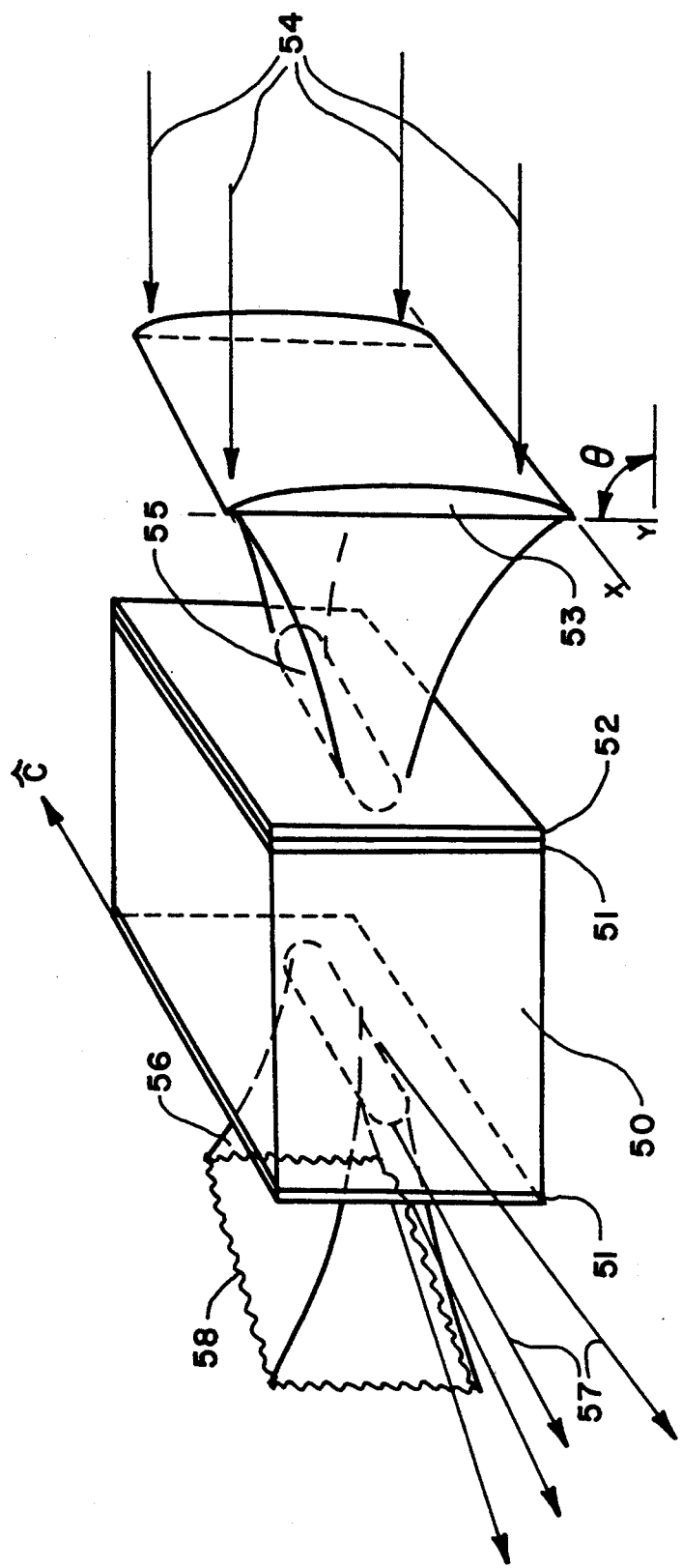
FIG. 5 is a perspective view of the preferred embodiment utilizing an antireflection coated crystal of strontium barium niobate (SBN) and cylindrical focusing optics.

FIG. 5 is a perspective view of the preferred embodiment utilizing an antireflection coated crystal of strontium barium niobate (SBN) and cylindrical focusing optics. The limiter device shown includes properly oriented photorefractive crystal 50, appropriate anti-reflection coatings 51, broadband high reflectance coating 52 and cylindrical lens 53 to providing focusing of the incident radiation. Anti-reflection coating 51 is responsive over the range of 0.40 to 0.68 micrometers and broadband high reflectance coating 52 which reflects all radiation from 0.68 micrometers to the near infrared (NIR) spectral region, at least out to 1.5 micrometers.

The beam fanning limiter is a beam control device which spatially redistributes the energy in a coherent optical beam 54, incident at angle θ, which may be all or a portion of the total incident radiation at the entrance aperture of the limiter. The total radiation field in the input beam is defined as that composed of both coherent laser radiation and some incoherent information bearing scene. In this embodiment shown in FIG. 5, cylindrical lens 53 focuses incident light 54 into intense light stripe 55 that is directed into crystal 50 so that it is coincident with the c-axis direction of crystal 50.

The geometry defined by light stripe 55 allows maximum use of the dominant electro-optic coefficients for tungsten bronze crystals and provides the maximum gain-length product for a given crystal size. In this limiting device the redistribution of energy is not a broad fan shaped distribution but is generally confined to a plane defined by the crystalline c-axis and incident stripe 55 introduced into crystal 50 by cylindrical focusing lens 53. The light exiting from crystal 50 includes transmitted beam 56 and beam fan 57 which is fanned out of the optical path in a direction determined by the direction of the crystalline c-axis, the sign of the dominant electro-optic coefficient and the sign of the charge carriers participating in the photorefractive process. When crystal 50 is rotated 90 degrees relative to the c-axis as an alternative embodiment, multi-wavelength light is also diverted from the optical path within the crystal to form a cone of intense multicolor light "rainbow" which gives a multi-wavelength capability to the limiter device. In both embodiments, transmitted beam 56 contains only incoherent radiation and is recorded at detector input 58.

A tight focus in one dimension is desired while still maintaining a long interaction length in the other to allow full exploitation of the dominant electro-optic coefficient in a particular material. The tight focus results in the desired increase in intensity of the incident laser beam and results in a much faster limiter response at no cost to the over all steady-state beam depletion. The resulting device and technique provides a vast improvement over prior art photorefractive limiters in improved time response, maximum use of gain-length product in the medium, and other parameters, all with a simple design. The resulting field of view is determined by the f/# of the focusing optics and the physical dimensions of the crystal positioned in the focal plane of the focusing optics since the crystal serves as a field stop when it occupies this position in the optical system. For a typical F/5 cylindrical lens and a 1 cm cube of photorefractive crystal the FOV would be 15 degrees. The minimum reduction of incoherent light, defined as information bearing or scene light, is reduced only by a factor of a few % over the prior art using unfocused beams. Broadband multiline protection from the entire visible spectrum is achieved for substantially all pulsewidths and continuous wave lasers. Very high optical densities of coherent light is achieved on the order of 3 to 4 with a high laser damage threshold on the order of $>0.15$ GW/cm$^2$. The time to reach limiting via fanning is reduced by 2 to 3 orders of magnitude.

Figure 6:
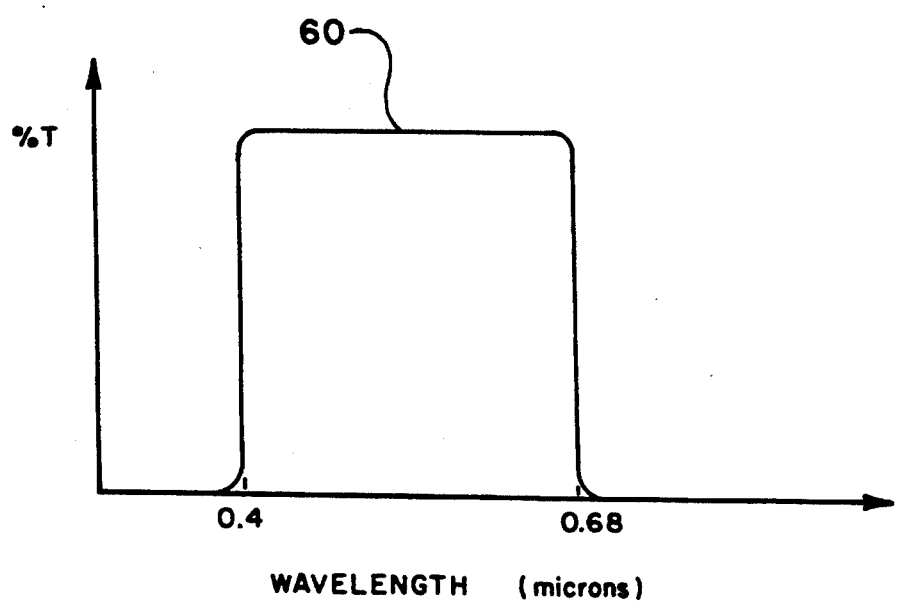
FIG. 6 is a graph of percent transmission as a function of wavelength for the coated crystal of FIG. 5.

FIG. 6 is a graph of percent transmission as a function of wavelength for the generalized transmission characteristics of coatings 51 and 52 of FIG. 5 utilizing a typical 1 cm thick specimen of SBN, BSKNN or BaTiO$_3$ for incoherent radiation. The transmission of coherent light in this incoherent spectral "pass band" shown as band 60 is strongly attenuated due to beam fanning. Since the linear absorption of these photorefractive materials can be very low the device will have low insertion loss for incoherent light and provide very fast strong attenuation of coherent light.

While this invention has been described in terms of preferred embodiment consisting of the technique and device disclosed, those skilled in the art will recognize that the invention can be practiced with modification within the spirit and scope of the appended claims.

Having thus described my invention, what we claim as new and desire to secure by Letters Patent is as follows:

1. A passive broadband sensor protection and enhancement system which achieves broadband multiline protection from the visible spectrum for substantially all pulsewidths and cw lasers, with enhanced time response and interaction length, the system including:
   a cylindrical lens on an optical axis which focuses incident light into an intense light strip;
   a photorefractive crystal on the optical axis, the crystal including an input and output face, where the intense light strip is coincident upon the input face relative to a plane normally referred to as the c-axis of the crystal;
   a broadband high reflection coating proximate to the input face for reflection of all radiation from approximately 0.68 to at least out to 1.5 micrometers, whereby light exiting from the output face of the crystal results from a photorefractive process that includes a transmitted beam and beam fan, the beam fan is fanned out of the optical path in a direction determined by the c-axis, dominant electro-optic coefficient, and charge carriers participating in the photorefractive process such that the transmitted beam contains only incoherent radiation as input to the sensitive detector resulting in broadband multiline protection from the visible spectrum for substantially all pulsewidths and cw lasers, with enhanced time response and interaction length.

2. The passive broadband sensor protection and enhancement system of claim 1 wherein there is further included an anti-reflection coating proximate to the input and output faces of the photorefractive crystal responsive over approximately a 0.40 to 0.68 micrometer wavelength range.

3. A passive broadband sensor protection and enhancement technique which achieves broadband multiline protection from the visible spectrum for substantially all pulsewidths and cw lasers, with enhanced time response and interaction length, the technique including the steps of:
   providing a photorefractive crystal on the optical axis, the crystal including an input and output face;
   providing for reflection of all input radiation proximate to the input face, from approximately 0.68 to at least out to 1.5 micrometers wavelength;
   focusing incident light on the optical axis into an intense light strip coincident upon the input face relative to a plane normally referred to as the c-axis of the crystal, whereby light exiting from the output face of the crystal results from a photorefractive process that includes a transmitted beam and beam fan, the beam fan is fanned out of the optical path in a direction determined by the c-axis, dominant electro-optic coefficient, and charge carriers participating in the photorefractive process such that the transmitted beam contains only incoherent radiation as input to the sensitive detector resulting in broadband multiline protection from the visible spectrum for substantially all pulsewidths and cw lasers, with enhanced time response and interaction length.

4. The passive broadband sensor protection and enhancement technique of claim 3 wherein their is further provided an anti-reflection coating proximate to the input and output faces of the photorefractive crystal responsive over approximately a 0.40 to 0.68 micrometer wavelength range.

* * * * *